Jan. 3, 1967 K. M. HAMMELL 3,295,189

TERMINAL BOARD WIRING

Filed Aug. 15, 1963 2 Sheets-Sheet 1

Jan. 3, 1967 K. M. HAMMELL 3,295,189

TERMINAL BOARD WIRING

Filed Aug. 15, 1963 2 Sheets-Sheet 2

3,295,189
Patented Jan. 3, 1967

3,295,189

TERMINAL BOARD WIRING

Kemper M. Hammell, Harrisburg, Pa., assignor to AMP Incorporated, Harrisburg, Pa.

Filed Aug. 15, 1963, Ser. No. 302,398
2 Claims. (Cl. 29—155.5)

This invention relates to an improved arrangement for wiring closely spaced posts on a terminal board.

An object of this invention is to provide a simple, easy to use way for assisting a person in manually wiring terminal boards according to predetermined patterns.

A further object is to provide an inexpensive, versatile arrangement for carrying out the wiring of terminal boards in any desired pattern.

These and other objects will in part be understood from the accompanying drawings and in part understood from the following description.

One type of electrical terminal board to which this invention is applicable has a vast number of thin, closely spaced posts projecting like spikes from the plane of the board. Each post may for example be the terminal connection to a respective one of the multitude of elements in a computer. In order to interconnect these elements in a proper pattern to program the computer, it is necessary to make a large number of interconnections between these posts. This is accomplished by means of short leads or jumper wires of various lengths which are connected between respective ones of the posts. Connecting of the ends of one of these wires between two of the posts is a simple matter once the right posts are identified. However, with the vast number of posts facing him, the operator in fact usually spends more time in finding the right posts than in making the connections. Then after he has made the connections, the wire has to be laid between the rows and columns along a particular path chosen beforehand as the best one for this connecting wire from the standpoint of reducing electrical cross-talk to other wires and noise. This wire-laying step also presents the chance of confusion and delay or of deviation from the designed wire-laying pattern. Because of these difficulties, the wiring of terminal boards is relatively slow, expensive, and highly subject to operator errors. The present invention greatly simplifies the manual wiring of such boards.

In accordance with the present invention, there is provided one or more cards or templets by means of which an operator can immediately identify a particular pair of posts to which each wire should be connected and the path between the columns and rows of posts along which the wire should be laid. This arrangement insures that connections are made to the right posts and that the wires are properly laid through the card: unless this is so, the operator will be unable to remove the card. In addition to providing instant visual location of the correct posts and wire-laying path, each card carries on its face printed information for the operator, telling him wire length, color, gage, etc., for the particular connections to be made. Thus his job is greatly simplified and made essentially fool-proof. By providing the operator with a stack of these cards, one for each interconnection, and with each card in a predetermined sequence, very complex wiring patterns on the board can be carried through quickly, easily, and with a high degree of accuracy and uniformity.

A better understanding of the invention, together with a fuller appreciation of its many advantages, will best be gained from the following description given in connection with the accompanying drawings wherein.

Figure 1:
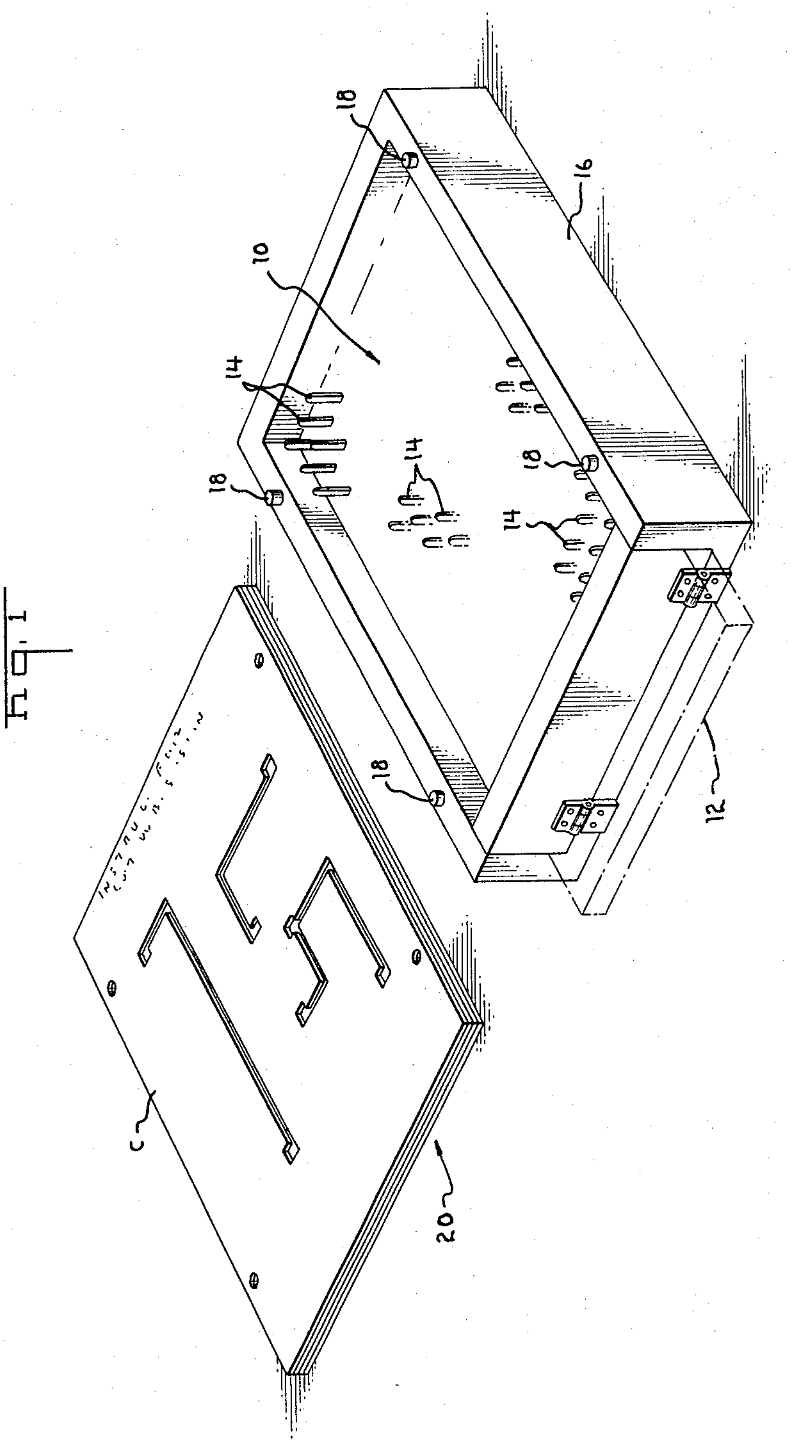
FIGURE 1 is a perspective view of a terminal board mounted in a temporary holding frame which is adapted to receive a wiring card or templet in accordance with the invention.

The wiring board 10 shown in FIGURE 1 comprises a base panel 12 from which project a multitude of spike-like terminal posts 14. These posts are arranged in closely spaced rows and columns and are adapted to be interconnected in a predetermined pattern by means of short-length connecting wires. Board 10 is here held temporarily in a frame 16 from which the board can be removed when the wiring of the board is completed. The top of frame 16 has four index pins 18 which serve to position a wiring card in exact relation over the ends of posts 14. On the table to the left of frame 16 is a stack 20 of these cards waiting to be placed one-by-one, as required, by the operator in the process of wiring the board.

Figure 2:
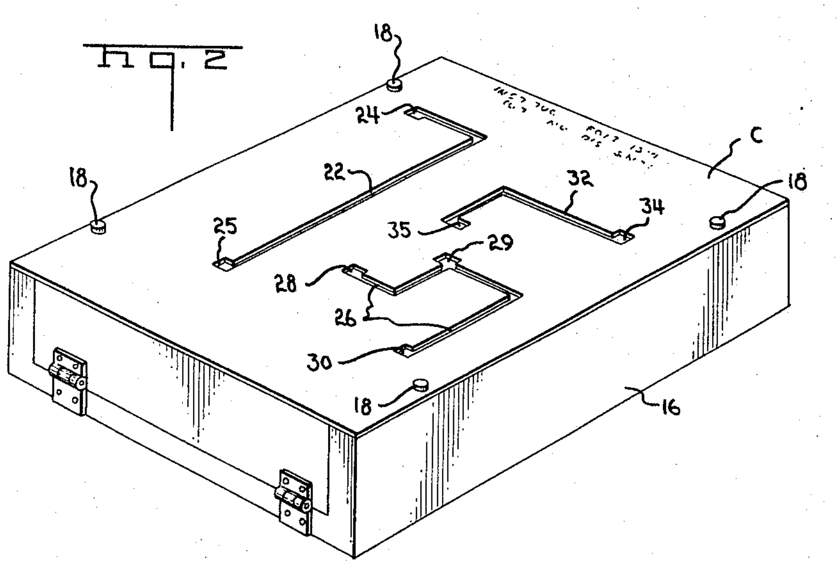
FIGURE 2 is a view similar to FIGURE 1 but showing a wiring card mounted on the frame.

FIGURE 2 shows frame 16 with a card C, the top card in the stack in FIGURE 1, positioned on pins 18 just over the ends of posts 14. Three separate wiring paths, and the respective posts, are located by card C. The first path is formed by a narrow slot 22 whose two ends terminate in holes 24 and 25, respectively. The width of the slot is slightly less than the lateral spaces between adjacent posts. Each hole has its center precisely above the end of a chosen one of the multitude of posts 14 and is just large enough for the insertion of the nose of a tool for connecting the end of a wire to the post under the hole. Slot 22 is offset from the center of hole 24 and of hole 25 to permit a wire (after its two ends have been connected to the posts beneath holes 24 and 25) to be slipped through the slot and layed down along the spaces between rows and columns of posts 14 in the path determined by the slot. Until and unless each wire connected and layed in this way through card C has been properly placed, the card cannot be removed from frame 16. Thus the card not only greatly simplifies and speeds up the operator's work, but it also insures complete accuracy.

A second path on card C is defined by a slot 26 which begins at a hole 28, proceeds through a hole 29 and terminates in a hole 30. This configuration permits the interconnection of three posts. The final path on the card is along a slot 32 running between holes 34 and 35.

To further simplify the operator's work in wiring the terminal board, the top of card C, in an area not used for wiring, has printed on it information as to wire size, type, length, color, etc. for each of the paths on the card.

Figure 3:
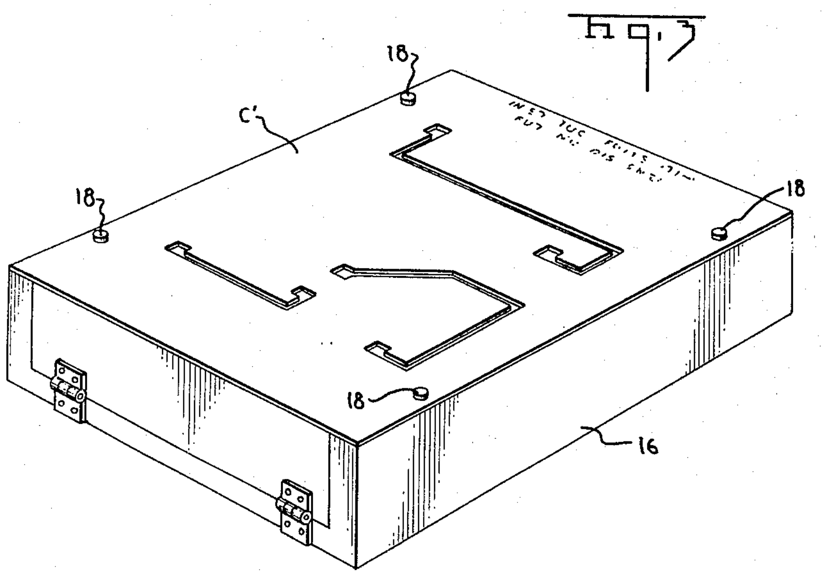
FIGURE 3 is a view similar to FIGURE 2 but showing another card in place on the frame.

FIGURE 3 shows another card C′ from stack 20 in place on frame 16. This card gives several additional wiring paths, one of which, it will be noted, runs along a diagonal with respect to the orthogonal rows and columns of posts 14. After the wiring for each card is finished, the operator removes the card and puts the next one on the frame. Thus the exact step-by-step sequences and correct wiring patterns for a board are determined by a given stack of cards. Of course, a stack of cards can be used over and over again to wire as many boards as desired, this system giving the assurance that all boards will be wired in exactly the same way.

Each card C can be made of stencil cardboard, for example, and they can be produced at very low cost.

The above description is intended in illustration and not in limitation of the invention. Various minor changes in the embodiment illustrated may occur to those skilled in the art and can be made without departing from the spirit or scope of the invention as set forth.

I claim:

1. A method for hand-wiring terminal boards having a multiplicity of posts to be interconnected, said method comprising the steps of cutting in a template a narrow slot to determine a given wiring path, the ends of the slot ending in enlarged holes which permit the insertion of a connecting tool against the ends of selected posts, placing said templet in predetermined position over a board to be wired, connecting one end of a wire to a post and the other end to another post, laying said wire through said slot in the spaces between rows and columns of said posts, removing said templet, and then repeating the above steps with another templet having a different pattern, and so on until said board is fully wired.

2. A method of preventing electrical cross-talk and of assuring proper connections between predetermined terminals in the wiring of a terminal board of the kind wherein a plurality of terminals are oriented closely together in arrays, said method including: determining each pair of terminals to be connected, delineating for each pair of terminals to be connected the optimum path therebetween to be followed by a connecting wire to avoid electrical cross-talk with respect to other wires, specifying the length of wire required to connect the two terminals of each pair of terminals following the delineated optimum path therebetween, preparing a plurality of wiring cards of size and shape related to the size and shape of the board to be wired, displaying on individual cards information showing the precise location of two terminals of a pair of terminals to be connected together with the exact length and kind of wire necessary to connect the terminals following the optimum path between them, forming openings in each card directly related to the information displayed on the card physically locating the two terminals to be connected and the optimum path delineated therebetween, and arranging the cards in a stack in the order in which the pair of terminals should be connected; whereby the cards can be used from the stack by an operator one at a time in series to provide the information needed to cut the proper length and kind of wire for connecting the specified pair of terminals and juxtaposed with respect to the board to identify and provide access to the particular pair of terminals involved and to delineate the optimum path therebetween to be followed by the measured length of selected wire.

References Cited by the Examiner

UNITED STATES PATENTS

| | | | |
|---|---|---|---|
| 1,973,364 | 9/1934 | Wood | 33—174 |
| 2,182,968 | 12/1939 | Lunsford | 29—155.55 |
| 2,690,017 | 9/1954 | Neill | 33—174 |
| 2,987,804 | 6/1961 | Nichol | 29—155.55 |

JOHN F. CAMPBELL, *Primary Examiner.*

J. M. ROMANCHIK, JR., *Assistant Examiner.*